(12) United States Patent
Waters et al.

(10) Patent No.: US 9,058,534 B2
(45) Date of Patent: Jun. 16, 2015

(54) SYSTEM AND METHOD FOR IMPLEMENTING NETWORK COMMUNICATION FOR A BAR CODE SCANNER

(71) Applicant: Opticon, Inc., Renton, WA (US)

(72) Inventors: Michael J. Waters, Tukwila, WA (US); Scott McGhee, Seattle, WA (US); Jiang Qin, Renton, WA (US); Kenneth Y. Ogami, Kirkland, WA (US)

(73) Assignee: Opticon, Inc., Renton, WA (US)

( * ) Notice: Subject to any disclaimer, the term of this patent is extended or adjusted under 35 U.S.C. 154(b) by 0 days.

(21) Appl. No.: 13/945,529

(22) Filed: Jul. 18, 2013

(65) Prior Publication Data

US 2015/0021398 A1 Jan. 22, 2015

(51) Int. Cl.
*G06K 19/00* (2006.01)
*G06K 7/10* (2006.01)

(52) U.S. Cl.
CPC .................. *G06K 7/10821* (2013.01)

(58) Field of Classification Search
USPC ........................................... 235/462
See application file for complete search history.

(56) References Cited

U.S. PATENT DOCUMENTS

| | | | |
|---|---|---|---|
| 2005/0082371 A1* | 4/2005 | Schmidt et al. | 235/462.45 |
| 2008/0217392 A1* | 9/2008 | Weiner et al. | 235/375 |
| 2012/0138685 A1* | 6/2012 | Qu et al. | 235/462.15 |

* cited by examiner

*Primary Examiner* — Matthew Mikels
(74) *Attorney, Agent, or Firm* — Kaplan Breyer Schwarz & Ottesen, LLP

(57) ABSTRACT

A scanning system and method are disclosed which may include a bar code scanner module incorporated within a housing; and a wireless network transceiver coupled to the bar code scanner module and operable to communicate with at least one other communication device, the bar code scanner and the transceiver forming a scanning device. The transceiver may communicate employing Zigbee network protocol.

14 Claims, 5 Drawing Sheets

SYSTEM AND METHOD FOR IMPLEMENTING NETWORK COMMUNICATION FOR A BAR CODE SCANNER

BACKGROUND OF THE INVENTION

This application relates in general to scanning devices and in particular to a portable scanning apparatus able to communicate with other devices.

Portable bar code scanners are known in the art. The scanners are generally stand-alone devices that may include computer circuitry and data storage sufficient for operating the scanner and for storing scan data obtained by the scanner. Once a scan operation is complete, the obtained scan data may be uploaded to a central computer, where it may be used for inventory management and the like. There is generally a significant delay between the time at which data is gathered by the scanner and time at which a decision may be made based on the obtained scan data. In certain cases, this delay may impose a burden on the utility of the acquired scan data.

Some scanners have been provided with the ability to communicate through networks. However, the communication capabilities provided for scanners to date are not well suited to the operational requirements of scanner systems.

Accordingly, there is a need in the art for an improved system and method for responding to information obtained by scanners.

SUMMARY OF THE INVENTION

According to one aspect, the invention is directed to a scanning system and method that may include a bar code scanner module incorporated within a housing; and a wireless network transceiver coupled to the bar code scanner module and operable to communicate with at least one other communication device, the bar code scanner and the transceiver forming a scanning device. The transceiver may communicate by employing the Zigbee network stack.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
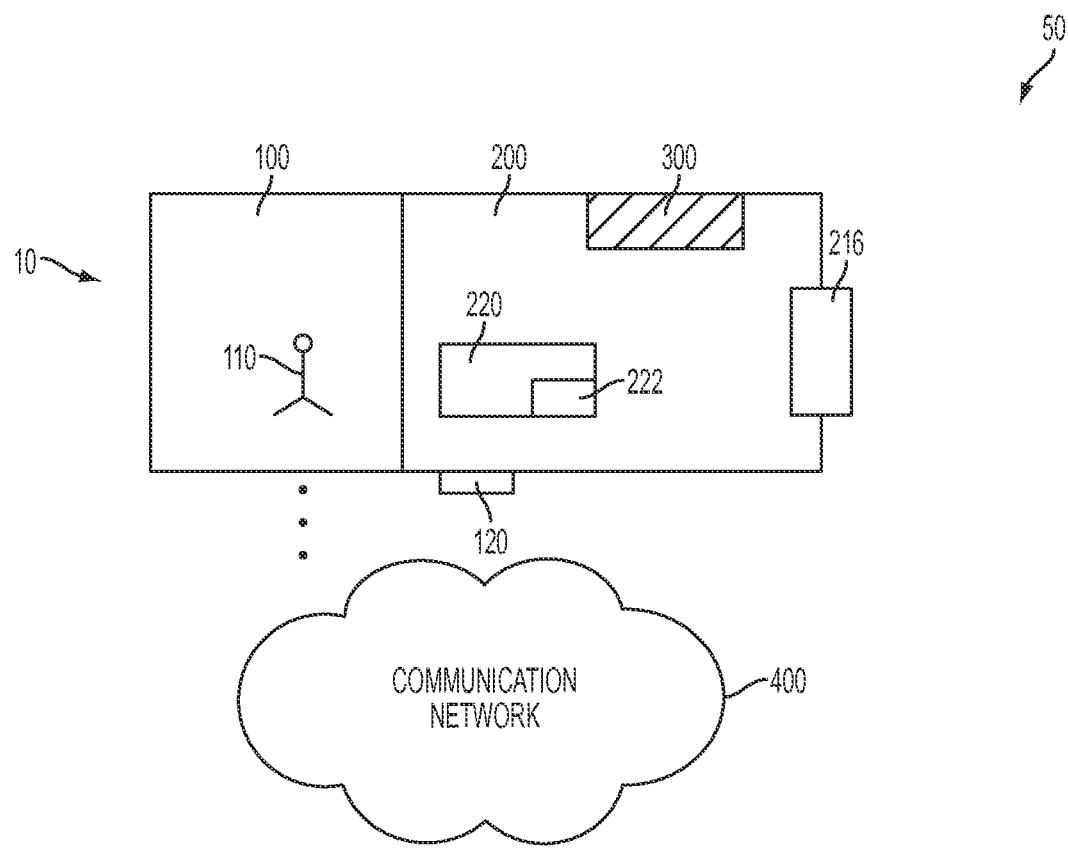
FIG. 1 is a plan view of a scanner having a transceiver and in communication with a communication network in accordance with an embodiment of the present invention.

FIG. 1 is a plan view of a scanning system 50 that may include one or more scanning systems 10 and a communication network 400 in accordance with an embodiment of the present invention. Scanning apparatus (scanning device) 10 may include transceiver 100 (which preferably communicates wirelessly), scanner module 200, and/or battery 300, which is preferably rechargeable. Scanning apparatus 10 may periodically be connected to computing system 500 to upload and/or download data, and/or to charge battery 300. Computing system 500 is discussed in greater detail in connection with FIG. 5. Scanning apparatus 10 may communicate with one or more communication nodes (such as other scanning devices, personal computers, or other communication-enabled devices) over network 400, using transceiver 100. Transceiver 100 may include bi-directional antenna 110.

Scanner module 200 may include computer processor 220 which may in turn include computer memory 222. Memory 222 may store scan data obtained by scanner module 200, operational data for controlling the operation of scanner module 200, and/or data for other purposes. Scanner module 200 is preferably coupled to, and in communication with, transceiver 110. Thus, transceiver 100 may serve as a communication gateway both for both "outbound" data obtained by scanner module 200 and destined for a receiving device elsewhere on network 400, and/or for "inbound" data coming from network 400 and destined for scanning apparatus 10, and which may be stored in memory 222.

The communication conducted by scanning apparatus 10 and by the other communicating devices on network 400 may employ the Zigbee network stack. However, the present invention is not limited to the use of this standard.

Battery 300 may be, but need not be, rechargeable. Disposable batteries may be employed instead. Battery 300 may be configured so as to be removable from scanning apparatus 10 for recharging purposes, and/or to enable a substitute battery to be installed within scanning apparatus 10. However, alternatively, scanning apparatus 10 could be configured so that a rechargeable battery 300 is permanently affixed within scanning apparatus 10.

Figure 2:
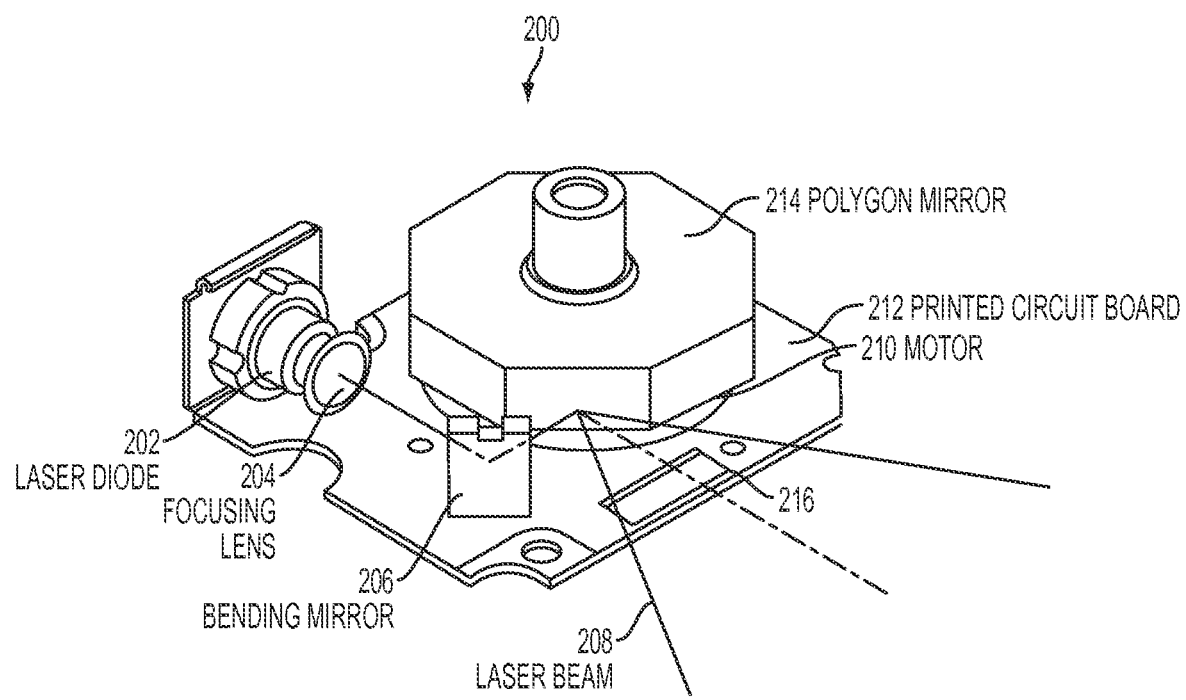
FIG. 2 is a perspective view of a scanner module in accordance with an embodiment of the present invention.
Figure 3:
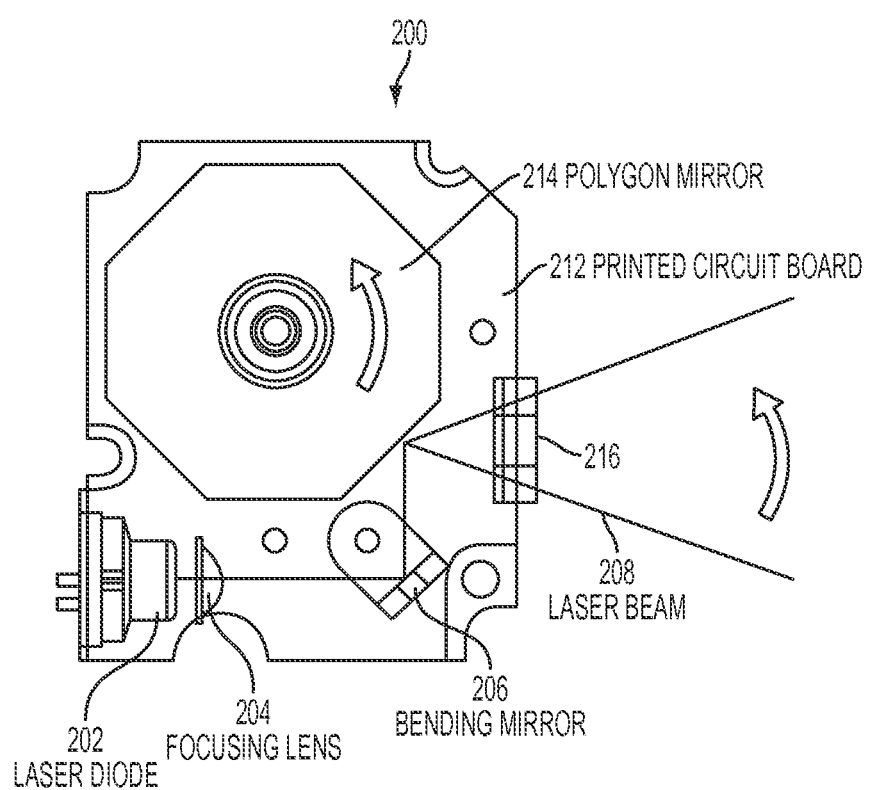
FIG. 3 is a plan view of the scanner module of FIG. 2.

FIG. 2 is a perspective view of scanner module 200 in accordance with an embodiment of the present invention. Scanner module 200 may include laser diode 202, focusing lens 204, bending mirror 206, laser beam 208, motor 208, motor 210, printed circuit board 212, polygon mirror 214, and/or detector 216. Moreover, scanner module 200 may be powered either by battery 300 (FIG. 1), by a power source in a docking station such as computing system 500, or by a combination of the foregoing. FIG. 3 is a plan view of scanner module 200 of FIG. 2. Suitable connections may be implemented (not shown) to convey signal data from detector 216 to electronic circuitry on scanner module 200 (or on a device in communication with scanner module 200) to receive, process, and store scan data from detector 216, as is known in the art.

The scanner module shown in FIGS. 2 and 3 is exemplary. The present invention is not limited to the specific implementation of scanner module shown therein. Any one of several possible configurations of a modern scanner could be used in conjunction with a memory stick in embodiments of the present invention.

When not connected to a host device, scanning apparatus 10 preferably runs on power from battery 300 which may be rechargeable and/or removable from scanning apparatus 10. In this mode of operation, a human operator may initiate operation of scanner module 200 by pressing button 120 (FIG. 1). Scanner module 200 may then scan a bar code, or other image, and receive scan data from the image. The scan data may then be digitized and stored in memory 222 and/or transmitted to a destination device in communication with network 400.

Computational power sufficient to operate scanner module 200 and to coordinate the transfer of data to memory 222 and/over over network 400 may be incorporated within processor 220 within scanning apparatus 10. Processor 220 may be incorporated within scanner module 200. Alternatively, some data processing capability may be incorporated within processors within both transceiver 100 and scanner module 200. Scanning apparatus 10 may continue operating in this mode until battery 300 needs recharging or replacement. Scanning apparatus 10 may be connected to a host device such as computing system 500 or other docking station.

Scanning apparatus 10 may be configured to self-install upon being connected to a host system such as computing system 500. At least one conductive path between computing system 500 and scanning apparatus 10 may be used to charge battery 300. Separately, scanning apparatus 10 may upload stored scan data from scanning module 200 to a memory device within computing system 500. Scanning apparatus 10 may also download data from a host device, which data could include ordinary payload data for storage in memory 222 which is not relevant to scanner module 200. Scanning apparatus 10 could also download data that includes operational data for the operation of scanner module 200.

Figure 4:
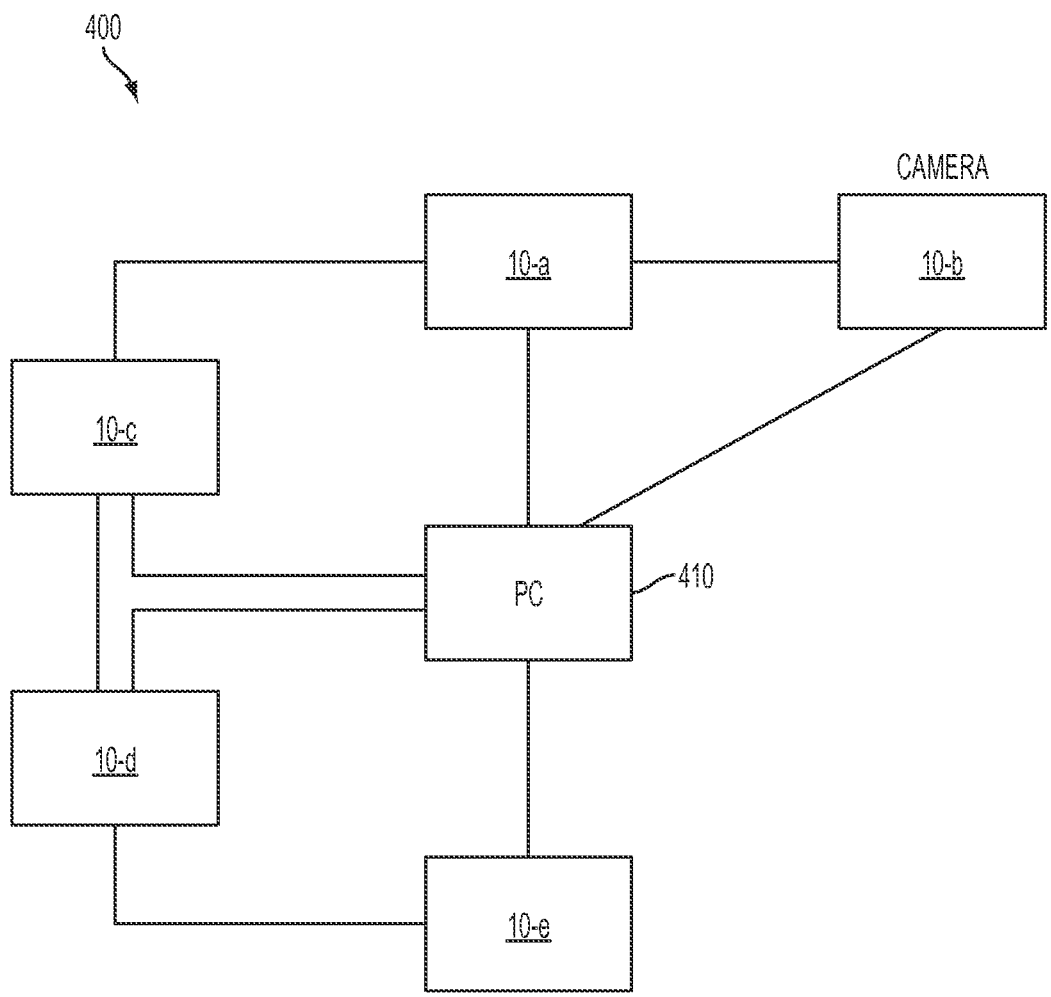
FIG. 4 is a block diagram of a communication network for enabling real-time communication among various devices in accordance with an embodiment of the present invention.

FIG. 4 is a block diagram of communication network 400 which may enable real-time communication among various scanners in a network, in accordance with an embodiment of the present invention.

Network 400 may include a one or more scanning systems 10-a, 10-c, 10-d, 10-d, 10-e and one or more cameras 10-b, and/or a personal computer (PC) 410 which may serve as a coordinator device for the Zigbee network layer of communication network 400. Network 400 could also include devices other than scanning systems, cameras, or personal computers. Though FIG. 4 presents one possible configuration of network 400, many other network configurations are possible. For instance, star networks, tree networks, and/or mesh networks may be employed.

In one embodiment, any device forming part of network 400 may transmit a message to any other device on network 400. Thus, for instance, scanning apparatus 10-a could scan a bar code or other image and transmit the data over network 400 to PC 410. PC 410 could then instruct a designated one of scanners 10-c, 10-d, or 10-e to perform a function in response to the scan data obtained by scanning apparatus 10-a. The function concerned could include one or more of: (a) performing another scan operation; (b) checking computer memory internal to the designated scanner to compare to data obtained by scanner 10-a; and/or (c) transmit selected data from the designated scanner to PC 410. However, the present invention is not limited to performing the above-listed functions in response to an analysis of scan data.

Preferably, when using a mesh topology, communication network 400 may enable any device on network 400 to communicate with any other device on network 400. This situation may enable an enormous improvement in operational flexibility, responsiveness of, and the effectiveness of scanning system 50. Effectively, data from any scanning apparatus 10 within network 400 may be made available, when suitable, to all of network 400. Thus, scanning system 50 need not wait for data from a particular scanning apparatus to be completely gathered and then uploaded to host computer to respond to data indicative of an urgent condition that would benefit from a rapid response. Moreover, PC 410 (or other data processing and data storage device) can be configured to have scan data that is continuously updated so that PC 410 has the most current data available anywhere within network 400.

Zigbee Network Operation

In the following, we discuss features and operational benefits of a system according to the present invention specific to using the Zigbee network stack. In one embodiment, the present invention may employ the Zigbee RF4CE standard. ZigBee is a standardized network stack—like Bluetooth—that is designed for devices that have low power use and that enable secure transmission of data, but which don't require high bandwidth. Zigbee can be used to form PANs (Personal Area Networks) with topologies that are either point-to-point (1 to 1), star (1 to many), or mesh (many to many) in design. Zigbee may use the PHY and MAC layers of the IEEE 802.15.4 standard, and may build the remainder of the OSI network stack layers on top of that.

In an embodiment, a bar code scanner may implement the full ZigBee network stack. Such an implementation may have many implications regarding the application of such a scanner such as using a mesh topology, in which case all bar code scanners within a network could share information. For example, all scanners within a network could synchronize their particular configuration or settings (enabled bar code symbols, prefix/suffix, real-time clock, etc.). Moreover, if the bar code scanners are able to store scanned data, the respective scanners, after scanning a given bar code, could check to see whether another bar code scanner in the network has already scanned the given bar code, and if so, decline to save the same bar code again.

Second, Similarly, the bar code checking process described above could be achieved using a personal computer (PC) where the PC is ZigBee-enabled, and where the PC operates on the Personal Area Network (PAN), and transmits settings to all of the scanners in the PAN, or confirms whether a barcode has previously been scanned.

Third, a bar code scanner could be triggered remotely by another ZigBee-enabled device in the Personal Area Network. For example, we consider a conveyor belt carrying items that need scanning in the vicinity of a scanner.

Fourth, in this situation, the received signal strength indication (RSSI) of the item needing scanning could be measured at already known fixed points. The strength of the RSSI as measured the pre-determined locations may be used to resolve the location of the scanner issuing the RSSI signal with reasonable accuracy. Once the location of the item at issue is determined, a network-connected device, such as, for instance PC 410 could identify the scanner closest to the item at issue, and instruct that scanner to prepare for a scan operation. Alternatively, a scanner in network 400 could scan an item and report the scan data, and some form of scanner identification (ID) back to PC 410. PC 410 preferably maintains a mapping of scanner device IDs to specific physical locations. Thus, upon receiving scan data indicative of the item at issue from the scanner, PC 410 may consult the mapping of scanner IDs to locations, and determine the location of the scanned item.

Fifth, upon receiving scan data for an item that has been flagged for one reason or another, a scanning apparatus 10 (or PC 410, or other device in network 400) could trigger a ZigBee-enabled camera to take a photograph of the flagged item. Other functions could be performed in response to a flagged item being scanned, or other driving event, that may include, but are not limited to: (a) sounding an alarm (such as for an item that is flagged as stolen or which is considered dangerous; and/or (b) notifying PC 410 of an error condition where a given bar code value has been recorded two or more times in incompatible locations.

Figure 5:
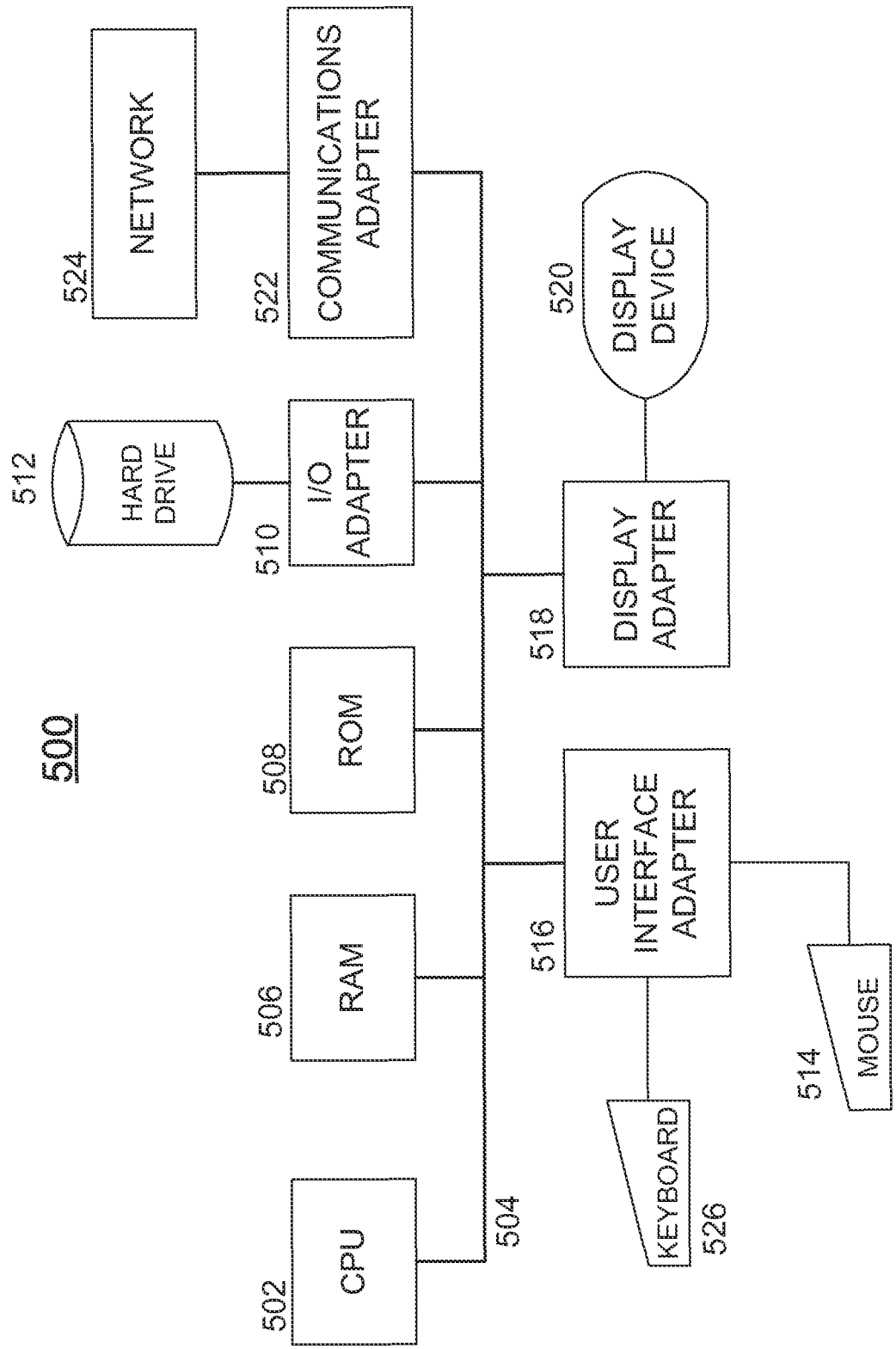
FIG. 5 is a block diagram of a computer system useable in conjunction with an embodiment of the present invention.

FIG. 5 is a block diagram of a computing system 500 adaptable for use with one or more embodiments of the present invention. For instance, computing system 500 may serve as a host computer to which scanning apparatus 10 may be coupled. Moreover, a computing system incorporating one or more of the components (depicted with individual blocks in FIG. 5) may be incorporated within scanner module 200 to store operational data for controlling the scanning operation (i.e. to control motor speeds, do initial processing on scan data, etc.), to store scan data received at detector 216, to control data transfer between scanner module 200 and communication network 400, and/or other functions useful for the operation of scanning apparatus 10.

In computing system 500, central processing unit (CPU) 502 may be coupled to bus 504. In addition, bus 504 may be coupled to random access memory (RAM) 506, read only memory (ROM) 508, input/output (I/O) adapter 510, communications adapter 522, user interface adapter 506, and display adapter 518.

In an embodiment, RAM 506 and/or ROM 508 may hold user data, system data, and/or programs. I/O adapter 510 may connect storage devices, such as hard drive 512, a CD-ROM (not shown), or other mass storage device to computing system 500. Communications adapter 522 may couple computing system 500 to a local, wide-area, or global network 524. User interface adapter 516 may couple user input devices, such as keyboard 526, scanner 528 and/or pointing device 514, to computing system 500. Moreover, display adapter 518 may be driven by CPU 502 to control the display on display device 520. CPU 502 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A scanning system comprising:
a bar code scanner module incorporated within a housing; and
a Zigbee-enabled wireless network transceiver, in communication with the bar code scanner module, and operable to communicate with at least one other communication device, the bar code scanner and the transceiver forming a scanning device;
wherein said scanning device is configured to remotely activate another one of said scanning device through the Zigbee-enabled wireless network transceiver of said scanning device over a communication network in response to an event detected by said scanning device.

2. The scanning system of claim 1 further comprising:
a Zigbee-enabled communication network in communication with the transceiver.

3. The scanning system of claim 2 wherein the wireless network has a mesh topology.

4. The scanning system of claim 2 wherein the communication network comprises:
a personal computer operable to establish a Personal Area Network (PAN) in which the computer is in communication with a plurality of scanning devices.

5. The scanning system of claim 2 wherein the communication network is operable to:
measure the received signal strength indication (RSSI) of a given scanning device to determine a location thereof.

6. The scanning system of claim 2 further comprising:
a camera in communication with the communication network and operable to take a photo in response to a signal received over the communication network.

7. A method, comprising:
providing a bar code scanner module and a Zigbee-enabled wireless transceiver coupled thereto, thereby forming a scanning device;
enabling communication between the scanning device and a Zigbee-enabled communication network;
providing a plurality of scanning devices in the Zigbee-enabled communication network; and
enabling a first of said scanning devices to remotely activate a second of said scanning devices over said Zigbee-enabled communication network in response to an event detected by said first scanning device.

8. The method of claim 7 comprising:
configuring the communication network with a mesh topology.

9. The scanning system of claim 7 further comprising:
incorporating a personal computer (PC) as part of the communication network; and
configuring a portion of the Zigbee-enabled communication network as a personal area network (PAN).

10. The method of claim 7 further comprising the step of:
the communication network measuring the received signal strength indication (RSSI) of a given scanning device to determine the location of the given scanning device.

11. The method of claim 7 further comprising:
placing a camera in communication with the communication network; and
causing the camera to take a photograph of a selected object in response to a signal received over the communication network.

12. A scanning system comprising:
a computer;
a plurality of bar code scanner modules each incorporated within a housing; and
a plurality of Zigbee-enabled wireless network transceivers with each associated with and in communication with one of the bar code scanner modules to form a scanning device, each scanning device configured with a full Zigbee network stack that includes star, tree and point-to-point networks and configured to be in communication with at least one other scanning device and the computer over the full Zigbee network stack.

13. The scanning system of claim 12, wherein the computer is adapted to measure the received signal strength indication (RSSI) of a given scanning device to determine a location thereof.

14. The scanning system of claim 12 further comprising:
a camera in communication with the computer and operable to take a photo in response to a signal received over a communication network that connects the computer and the scanning devices together.

\* \* \* \* \*